United States Patent
Soeterbroek et al.

(10) Patent No.: US 11,378,206 B2
(45) Date of Patent: Jul. 5, 2022

(54) MULTILAYER TUBE, PARTICULARLY FOR CHEMICAL AND FOOD-RELATED FLUIDS

(71) Applicants: TUBIGOMMA DEREGIBUS S.R.L., Saccolongo (IT); FLUORTUBING BV, Utrecht (NL)

(72) Inventors: Alexander J. A. Soeterbroek, Bosch en Duin (NL); Andrea Deregibus, Padua (IT)

(73) Assignees: TUBIGOMMA DEREGIBUS S.R.L., Saccolongo (IT); FLUORTUBING BV, Utrecht (NL)

( * ) Notice: Subject to any disclaimer, the term of this patent is extended or adjusted under 35 U.S.C. 154(b) by 0 days.

(21) Appl. No.: 16/689,401

(22) Filed: Nov. 20, 2019

(65) Prior Publication Data
US 2020/0166159 A1    May 28, 2020

(30) Foreign Application Priority Data
Nov. 28, 2018 (IT) .......................... 102018000010636

(51) Int. Cl.
*F16L 11/00* (2006.01)
*F16L 11/115* (2006.01)
*F16L 11/118* (2006.01)

(52) U.S. Cl.
CPC ......... *F16L 11/115* (2013.01); *F16L 11/1185* (2013.01)

(58) Field of Classification Search
CPC ............................. F16L 11/115; F16L 11/1185
USPC .................... 138/121, 122, 126, 133, 134
See application file for complete search history.

(56) References Cited

U.S. PATENT DOCUMENTS

| | | | | |
|---|---|---|---|---|
| 1,361,001 A | * | 12/1920 | Blaisdell ................ | F16L 11/115 156/86 |
| 1,974,285 A | * | 9/1934 | MacLachlan .......... | B29D 23/18 138/133 |
| 2,858,147 A | | 10/1958 | Guarnaschelli | |
| 3,047,026 A | * | 7/1962 | Kahn ..................... | F16L 11/112 138/122 |
| 3,540,488 A | * | 11/1970 | Voorhees ................ | F16L 59/08 138/121 |
| 3,580,289 A | * | 5/1971 | James, Jr. ............. | F16L 11/045 138/121 |

(Continued)

FOREIGN PATENT DOCUMENTS

| | | |
|---|---|---|
| EP | 2103856 A1 | 9/2009 |
| WO | 2017158316 A1 | 9/2017 |

OTHER PUBLICATIONS

Extended European Search Report dated Feb. 7, 2020 re; Application No. 19210582.3, pp. 1-6, citing: WO 2017/158316 A1, US 2 858 147 A, US 8 955 552 B2 and EP 1 103 856 A1.

*Primary Examiner* — James F Hook
(74) *Attorney, Agent, or Firm* — Cantor Colburn LLP

(57) ABSTRACT

A multilayer tube, particularly for chemical and food-related fluids, which includes, in succession from the inside outward a first layer constituted by a tubular sheath that is at least externally corrugated and which defines the duct for the fluid. The tube further includes at least one second layer, which has an inner layer, chosen from between a rubberized fabric and an elastomeric material with textile reinforcement, which is arranged on the first layer, and an outer covering which is arranged on the inner layer.

11 Claims, 1 Drawing Sheet

(56) References Cited

U.S. PATENT DOCUMENTS

| | | | | |
|---|---|---|---|---|
| 3,599,677 A | * | 8/1971 | O'Brien | F16L 11/085 138/122 |
| 3,605,232 A | * | 9/1971 | Hines | F16L 11/15 29/890.144 |
| 3,766,949 A | * | 10/1973 | Champleboux | F16L 11/11 138/133 |
| 3,917,898 A | * | 11/1975 | Iketani | H01B 7/425 174/15.6 |
| 4,415,389 A | * | 11/1983 | Medford | F16L 11/118 138/109 |
| 5,622,210 A | * | 4/1997 | Crisman | F16L 11/115 138/104 |
| 8,955,552 B2 | | 2/2015 | Nanney et al. | |
| 2004/0094221 A1 | * | 5/2004 | Martucci | B32B 3/26 138/121 |
| 2006/0042711 A1 | * | 3/2006 | Hibino | F16L 11/115 138/121 |
| 2008/0185063 A1 | * | 8/2008 | Bieszczad | F16L 11/085 138/126 |
| 2010/0180975 A1 | * | 7/2010 | Martucci | F16L 11/115 138/121 |

* cited by examiner

MULTILAYER TUBE, PARTICULARLY FOR CHEMICAL AND FOOD-RELATED FLUIDS

CROSS-REFERENCE TO RELATED APPLICATIONS

This application claims priority to Italian Patent Application No. 102018000010636, filed on Nov. 28, 2018, the contents of which are hereby incorporated by reference in their entirety.

TECHNICAL FIELD

The present disclosure relates to a multilayer tube, particularly for chemical and food-related fluids.

BACKGROUND

Such tubes are used in machines and in other applications where a connecting element is required that is flexible and suitable for contact with products, in particular but not exclusively of the chemical/pharmaceutical type and the like.

They are constituted by an inner layer, a tubular sheath which defines the passage duct of the fluid, and one or more outer layers overlaid on the inner layer and integrated with it.

The inner layer is made of fluorinated polymers, such as Fluorinated Ethylene Propylene (FEP), Tetrafluoroethylene Perfluoromethylvinylether (MFA), Perfluoroalkoxy alkanes (PFA), Polyvinylidene Difluoride (PVDF), Ethylene Chlorotrifluoroethylene (ECTFE), and Polytetrafluoroethylene (PTFE) and, in particular in the chemical/pharmaceutical industry, is preferably transparent or white.

In general, the outer layers can comprise textile reinforcements, elastomers and metallic or thermoplastic helices for reinforcement and protection which are adapted to improve flexibility and limit the risk of the tube collapsing during its bending.

The outer layers of the sheath are applied in succession based on the requirements dictated by the intended use of the tubes, by winding or braiding or by extrusion and subsequent vulcanization of the tube.

In the market there are two principal flexible tube technologies, which can be differentiated according to the type of adhesion present between the innermost layer constituted by the extruded fluoropolymer sheath and all of the outermost part that covers it.

The first type is a flexible hose made with an extruded sheath, as the first layer, and is subjected externally to a chemical process known as "cementation", the purpose of which is to increase the adhesiveness of the outer surface of the sheath in order to facilitate the adhesion on it of another layer.

The second type is a flexible hose with an extruded sheath, but is not subjected to external cementation. In this case the fluoropolymer sheath is incorporated in the finished structure of the tube, but not with the same capacity for adhesion with the outer layer that a sheath subjected to cementation possesses.

Among the tubes used widely in the sector and belonging to the second type described, there are tubes which comprise an inner layer made of PTFE which is constituted by a tube which is corrugated in a screw-like manner only externally, therefore with a smooth inner surface. Substantially the outer surface has a helical contouring and the inner surface of the covering that covers the inner layer is correspondingly shaped complementarily. The contouring constitutes a helical groove which defines helical peaks and troughs with side walls substantially perpendicular to the longitudinal axis of the tube, and inside which a metallic wire wound in a helix can be accommodated.

These tubes also comprise a reinforcement layer which is constituted by a sleeve of fabric made of metallic or textile material and an outer covering outside the sleeve which is made of elastomeric material or of plastic material and is stuck to the sleeve.

The inner layer, being corrugated, gives greater flexibility to the tube than a smooth inner layer.

The reinforcement layer increases the resistance of the tube to bending, preventing it from collapsing.

Although it has the advantages listed above, such tubes are not devoid of drawbacks.

The presence of metallic parts adds a significant weight to the tube and therefore it is difficult to handle during installation and maintenance.

Furthermore, when the tube is cut, the last few turns of the metallic winding tend to detach from the inner layer, exiting from the troughs.

Also, its installation presents a remarkable complexity while connecting it with another tube. In fact, in order to connect one tube with another, the installation technician has to cut the tube to the size required and remove the outer layer of covering at the cut end, for a length adapted to the connector that it is desired to install.

The operation to remove the outer layer is often laborious and requires skill on the part of the operator.

SUMMARY

The aim of the present disclosure is to provide a multilayer tube which is capable of improving the known art in one or more of the above mentioned aspects.

Within this aim, the disclosure provides a multilayer tube that can be easily and rapidly connected.

The disclosure further provides a multilayer tube that can be easily flexed and which at the same time is strong.

The disclosure also provides a multilayer tube that is also relatively light.

The present disclosure overcomes the drawbacks of the known art in an alternative manner to any existing solutions.

The disclosure also provides a multilayer tube that is highly reliable, easy to implement and of low cost.

This aim and these and other advantages which will become better apparent hereinafter are achieved by providing a multilayer tube, particularly for chemical and food-related fluids, which comprises, in succession from the inside outward:
  a first layer constituted by a tubular sheath that is at least externally corrugated and which defines the duct for the fluid,
  at least one second layer, which comprises an inner layer, chosen from between a rubberized fabric and an elastomeric material with textile reinforcement, which is arranged on said first layer, and an outer covering which is arranged on said inner layer.

BRIEF DESCRIPTION OF DRAWINGS

Further characteristics and advantages of the disclosure will become better apparent from the detailed description that follows of a preferred, but not exclusive, embodiment of the multilayer tube according to the disclosure, which is illustrated for the purposes of non-limiting example in the accompanying drawings wherein.

DETAILED DESCRIPTION OF DRAWINGS

Figure 1:
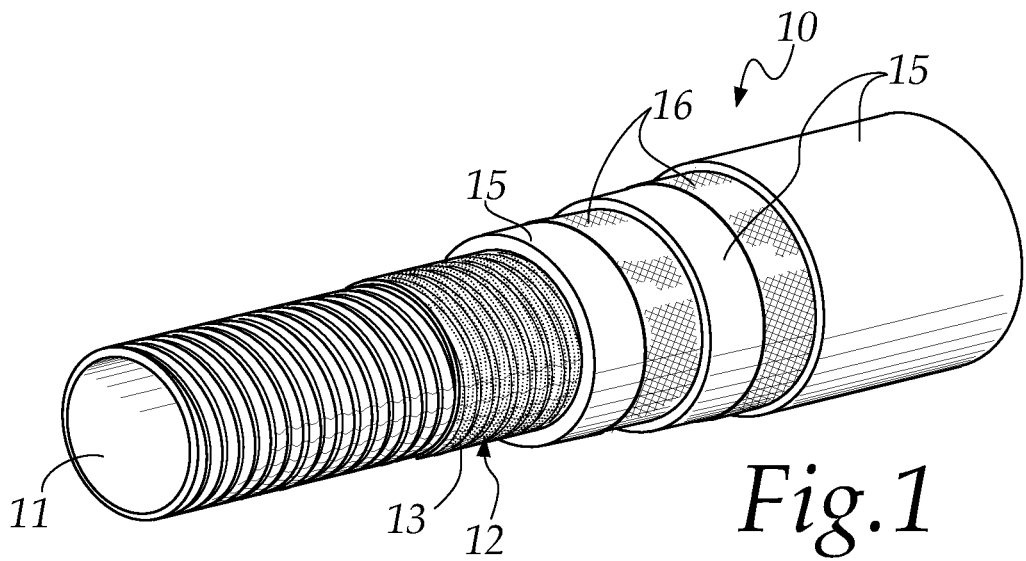
FIG. 1 is a perspective view of a multilayer tube according to the disclosure.
Figure 2:
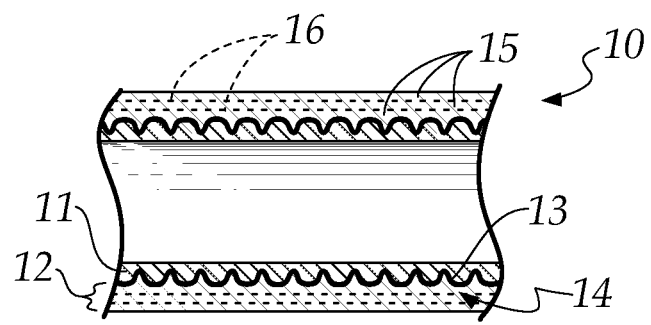
FIG. 2 is a longitudinal cross-sectional view of a portion of multilayer tube.
Figure 3:
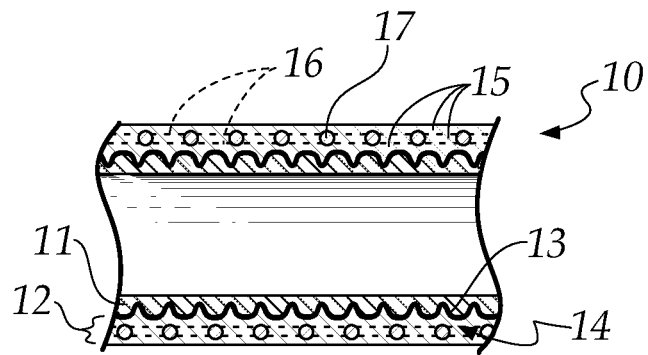
FIG. 3 is a longitudinal cross-sectional view of a portion of multilayer tube in a variation thereof.

With reference to the FIGS. 1-3, the multilayer tube according to the disclosure, generally designated by the reference numeral 10, comprises, in succession from the inside outward:
- a first layer 11 constituted by a tubular sheath that is at least externally corrugated and which defines the duct for the fluid,
- at least one second layer 12, which comprises an inner layer 13, chosen from between a rubberized fabric and an elastomeric material with textile reinforcement, which is arranged on the first layer 11, and an outer covering 14 which is arranged on the inner layer 13.

The first layer is constituted by a fluorinated polymer, preferably PTFE, or in any case chosen from among FEP, MFA, PFA, PVDF, ECTFE, and PTFE.

In addition, the first layer 11 is constituted by a tubular sheath which is smooth on the inner side for the passage of the fluid and is externally corrugated in a screw-like manner, so as to define helical peaks and troughs, while the second layer 12 is shaped internally like a female thread, so that it can be unscrewed from and screwed onto the first layer 11 and ensure a mechanical coupling and a seal against the relative axial movement between the two adjacent layers.

The first layer 11 is preferably transparent or white. Alternatively, it can be made in different colors.

The fabric of the inner layer 13 is constituted by a material that is preferably, but not exclusively, chosen among aramid, glass fiber, KEVLAR™ poly-para-phenylene terephthalamide, polyester, rayon and nylon.

The same fabric of the inner layer 13 can be wound in a helix on the first layer 11 or, alternatively, it can have a tubular braided structure so as to form a sleeve covering the first layer 11. In such case the fabric can be braided.

The outer covering 14 comprises at least one layer made of elastomeric material 15 and at least one textile reinforcement layer 16 in alternating layers. In the examples shown, there are three layers of elastomeric material 15 alternating with two textile reinforcement layers 16. The textile reinforcement layer 16 can be constituted by a combination of single threads, fabrics or reinforcement meshes. These are wound in a helix onto the inner layer 13, with areas of overlapping, and the elastomeric layers 15 are vulcanized in an autoclave in order to obtain a covering 14 in a single piece.

The first layer 11 is preferably not subjected to surface cementation, or in any case it is not treated in any way in order to facilitate adhesion. Therefore, in this case the first layer 11 does not adhere to the inner layer 13, remaining independent of it.

When during the production of the tube the inner layer is arranged on the first layer 11, it conforms to the shaping determined by the helical peaks and troughs. In this manner the second layer 12 obtains an internal shaping like a female thread, with which it interfaces with the screw-like outer shaping of the first layer 11.

In a variation illustrated in FIGS. 3 and 4, the outer covering 14 also comprises a metallic or thermoplastic wire 17 (in other cases there can be more than one), wound in a helix inside the outer covering 14.

Such wire 17 renders the tube more resistant to bending, thus preventing it from collapsing.

Use of the multilayer tube, according to the disclosure, is the following.

During installation of the tubes, the operator can easily cut the second layer 12 in a circular fashion with a cutter at a distance from the end which is equal to a portion of tube necessary to insert a connector.

The cut portion of second layer 12, equal to the useful length for inserting the connector, is easily unscrewed from the first layer 11, because the friction is low, the cut piece being relatively short.

The part of the first layer 11 without the covering of the second layer 12 has a screw-like outer shaping onto which a connector can be easily screwed by making the innermost layer 11 pass inside the tube-connector hole.

In practice it has been found that the disclosure fully achieves the intended aim and advantages by providing a multilayer tube that can be easily and rapidly connected, with an excellent level of flexibility and of strength.

In fact, by virtue of the fact that the inner layer is screw-shaped outside, it is perfectly coupled to the second layer, which is shaped like a female thread, thus creating a mechanical seal with it and so preventing the relative sliding between the two layers along the axis of the tube, and the two can also easily be separated during the operation of connecting and optional trimming at the ends, simply by unscrewing a portion of second layer.

Furthermore, by virtue of the smooth inner surface of the first layer, the passage of fluid in the cavity is optimized, thus limiting the possibility that components of the fluid might stop on its surface and/or create turbulence inside it.

In addition, the absence of metal fabrics in the tube appreciably contains its weight.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The invention claimed is:

1. A multilayer tube, for chemical and food-related fluids, which comprises, in succession from the inside outward:
- a first layer constituted by a tubular sheath that is at least externally corrugated and which defines a duct for fluid, and
- at least one second layer, which comprises an inner layer, chosen from between a rubberized fabric and an elastomeric material with textile reinforcement, arranged on said first layer, and an outer covering arranged on said inner layer, wherein said first layer is constituted by a tubular sheath which is externally corrugated in a screw manner so as to define a plurality of peaks and troughs, and said second layer is shaped internally as a female thread, such that the second layer is screwable into and is unscrewable from the first layer.

2. The multilayer tube according to claim 1, wherein said tubular sheath, which constitutes said first layer, is smooth on an inner side configured for passage of fluid.

3. The multilayer tube according to claim 1, wherein said first layer is constituted by a fluorinated polymer chosen from among Fluorinated Ethylene Propylene (FEP), Tetrafluoroethylene Perfluoromethylvinylether (MFA), Perfluoroalkoxy alkanes (PFA), Polyvinylidene Difluoride (PVDF), Ethylene Chlorotrifluoroethylene (ECTFE), and Polytetrafluoroethylene (PTFE).

4. The multilayer tube according to claim 1, wherein said first layer is transparent.

5. The multilayer tube according to claim 1, wherein said first layer is white.

6. The multilayer tube according to claim 1, wherein said first layer is colored.

7. The multilayer tube according to claim 1, wherein said first layer is conductive.

8. The multilayer tube according to claim 1, wherein the rubberized fabric of said inner layer is constituted by a material chosen among aramid, glass fiber, poly-para-phenylene terephthalamide, polyester, rayon and nylon.

9. The multilayer tube according to claim 1, wherein the rubberized fabric of said inner layer has a tubular structure that wraps around said first layer.

10. The multilayer tube according to claim 1, wherein said outer covering comprises at least one layer made of elastomeric material and at least one textile reinforcement layer in alternating layers.

11. The multilayer tube according to claim 1, further comprising a metallic or thermoplastic wire which is wound helically inside said outer covering.

\* \* \* \* \*